US012259115B2

(12) United States Patent
Thomson

(10) Patent No.: US 12,259,115 B2
(45) Date of Patent: Mar. 25, 2025

(54) MOUNTING DEVICE AND SYSTEM FOR SUSPENDING AN OBJECT

(71) Applicant: Murray Thomson, Beaumont (CA)

(72) Inventor: Murray Thomson, Beaumont (CA)

(73) Assignee: Murray Thomson, Alberta (CA)

( * ) Notice: Subject to any disclaimer, the term of this patent is extended or adjusted under 35 U.S.C. 154(b) by 0 days.

(21) Appl. No.: 18/362,184

(22) Filed: Jul. 31, 2023

(65) Prior Publication Data

US 2025/0043940 A1 Feb. 6, 2025

(51) Int. Cl.

| | |
|---|---|
| ***E04D 13/072*** | (2006.01) |
| ***E04D 13/00*** | (2006.01) |
| ***F21V 21/00*** | (2006.01) |
| ***F21V 21/08*** | (2006.01) |
| *F21W 121/00* | (2006.01) |

(52) U.S. Cl.

CPC .............. *F21V 21/08* (2013.01); *E04D 13/00* (2013.01); *E04D 13/0725* (2013.01); *F21W 2121/004* (2013.01)

(58) Field of Classification Search

CPC ........ F21V 21/08; F21V 21/088; F21V 21/00; F21W 2121/004; E04D 13/00; E04D 13/072

See application file for complete search history.

(56) References Cited

U.S. PATENT DOCUMENTS

| | | | | |
|---|---|---|---|---|
| 3,181,827 A * | 5/1965 | Sassin | F16L 3/24 24/339 |
| 3,599,916 A * | 8/1971 | Szabo | F21S 4/10 24/339 |
| 5,141,192 A | 8/1992 | Adams | |
| 5,566,058 A | 10/1996 | Protz, Jr. | |
| 5,607,230 A * | 3/1997 | Protz, Jr. | F21V 21/088 362/396 |
| 5,979,852 A | 11/1999 | Levesque | |
| 6,076,938 A * | 6/2000 | Kinderman | F21S 4/10 362/151 |
| 6,109,765 A | 8/2000 | Blanton | |
| 7,523,894 B1 * | 4/2009 | Eddy | E04D 13/0725 52/16 |
| 8,888,337 B2 | 11/2014 | Adams, IV et al. | |
| 2002/0000504 A1 | 1/2002 | Bayne | |
| 2003/0094822 A1 * | 5/2003 | Hill | E04F 21/00 294/211 |

(Continued)

*Primary Examiner* — Tan Le

(74) *Attorney, Agent, or Firm* — Argus Intellectual Enterprise, LLC; Jordan Sworen; Daniel Enea

(57) ABSTRACT

A mounting device for suspending an object from a gutter hanger. The mounting device includes a fastening member having a first end that secures to and conceals the gutter hanger. The first end includes a planar segment and a pair of flanges pivotally extending from lateral sides of the planar segment, wherein the planar segment is able to rest atop the gutter hanger and the pair of flanges can fold beneath the gutter hanger. A J-shaped bracket is disposed on a second end and hangs over an edge of a gutter when secured to the gutter hanger. An object fastener extends from an exterior side of the gutter plate and forms a channel for receiving and suspending an object therefrom. In this way, the mounting device avoids the need for direct installation of objects directly onto the gutter or house.

19 Claims, 5 Drawing Sheets

(56) References Cited

U.S. PATENT DOCUMENTS

| | | | | |
|---|---|---|---|---|
| 2007/0114337 | A1* | 5/2007 | Rommelmann | F21V 19/04 248/339 |
| 2007/0204521 | A1 | 9/2007 | Jackson et al. | |
| 2013/0014448 | A1 | 1/2013 | Jones | |
| 2013/0099076 | A1* | 4/2013 | Mickelson | F16B 2/241 248/304 |
| 2021/0102687 | A1 | 4/2021 | Brettmann-Skogg et al. | |
| 2023/0095202 | A1 | 3/2023 | Felt | |

* cited by examiner

MOUNTING DEVICE AND SYSTEM FOR SUSPENDING AN OBJECT

BACKGROUND OF THE INVENTION

The present invention relates to a systems for hanging objects from a house or other building structure. More specifically, the present invention provides a device and system for securing to and concealing a gutter hanger while forming a channel for receiving and suspending an object therefrom.

In outdoor environments, individuals and business owners often seek to enhance the aesthetics of their properties or provide functional benefits by hanging various objects from the exterior walls of their houses or business. Objects such as string lights, birdfeeders, planters, wind chimes, advertisements and outdoor decorations are commonly used for these purposes. To hang items, some people rely on fastening the object directly to the exterior wall or gutter using nails, screws, hooks, or adhesive tapes. Unfortunately, these methods can lead to significant issues for the property owner or caretaker.

One of the main problems with using conventional hanging methods is their impact on the structural integrity and safety of the building structure. Nails, screws, or hooks can create unnecessary punctures or holes in the exterior walls, leading to potential water leakages, rotting, or damage to the building's structure. Additionally, the constant weight and movement of objects, such as heavy planters or birdfeeders, hanging directly from gutters can weaken the gutter system and cause it to detach, posing hazards to pedestrians or property below.

Furthermore, conventional hanging methods often lack versatility and aesthetic appeal. Nails, screws, or hooks are not easy to remove or relocate, leaving behind unsightly holes or marks on the exterior walls or gutters. Furthermore, such methods limit the flexibility to adjust the position of the hung objects as per changing requirements or design preferences, restricting homeowners' ability to optimize their outdoor spaces.

Installing objects directly on the exterior walls or gutters requires tools, precise measurements, and, in some cases, the need for professional assistance, which is time-consuming. Additionally, some residential areas and homeowner associations impose restrictions on the use of conventional hanging methods due to concerns related to property damage, safety hazards, or aesthetic standards. Violation of such guidelines can result in fines or other legal consequences for the homeowners. Some devices exist that secure to a gutter temporarily, but these devices are designed only to receive a string of lights and do not overlay or conceal a gutter hanger. Therefore, there exists a need in the art for a device for securing to and concealing a gutter hanger while forming an object fastener, such as a hook, for receiving and suspending an object therefrom.

In light of the devices disclosed in the known art, it is submitted that the present invention substantially diverges in design elements and methods from the known art and consequently it is clear that there is a need in the art for an improvement for a mounting device and system for suspending an object. In this regard the instant invention substantially fulfills these needs.

SUMMARY OF THE INVENTION

In view of the foregoing disadvantages inherent in the known types of mounting devices and systems for suspending an object now present in the known art. The present invention provides a new mounting device and system wherein the same can be utilized for securing to a gutter hanger while forming an object fastener for receiving and suspending an object therefrom.

It is an objective of the present invention to provide a mounting device comprising a fastening member having a first end and an opposing second end, wherein the first end is adapted to secure to a gutter hanger. In some embodiments, the first end comprises a planar segment and a pair of flanges pivotally extending from lateral sides of the planar segment, wherein the planar segment is configured to rest atop the gutter hanger and the pair of flanges can fold beneath the gutter hanger.

It is another objective of the present invention to provide a mounting device wherein the second end comprises a J-shaped bracket configured to hang over an edge of a gutter and an object fastener that extends from an exterior side of the second end, forming a channel for receiving and suspending an object therefrom.

It is another objective of the present invention to provide a mounting device comprising a counterweight disposed on the fastening member configured to allow heavy objects to be suspended from the object fastener.

It is yet another objective of the present invention to provide a mounting system comprising a plurality of mounting devices configured to be spaced equidistant along an exterior of a building to receive an evenly distributed section of string of lights.

It is therefore an object of the present invention to provide a new and improved mounting device and system for suspending an object, that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
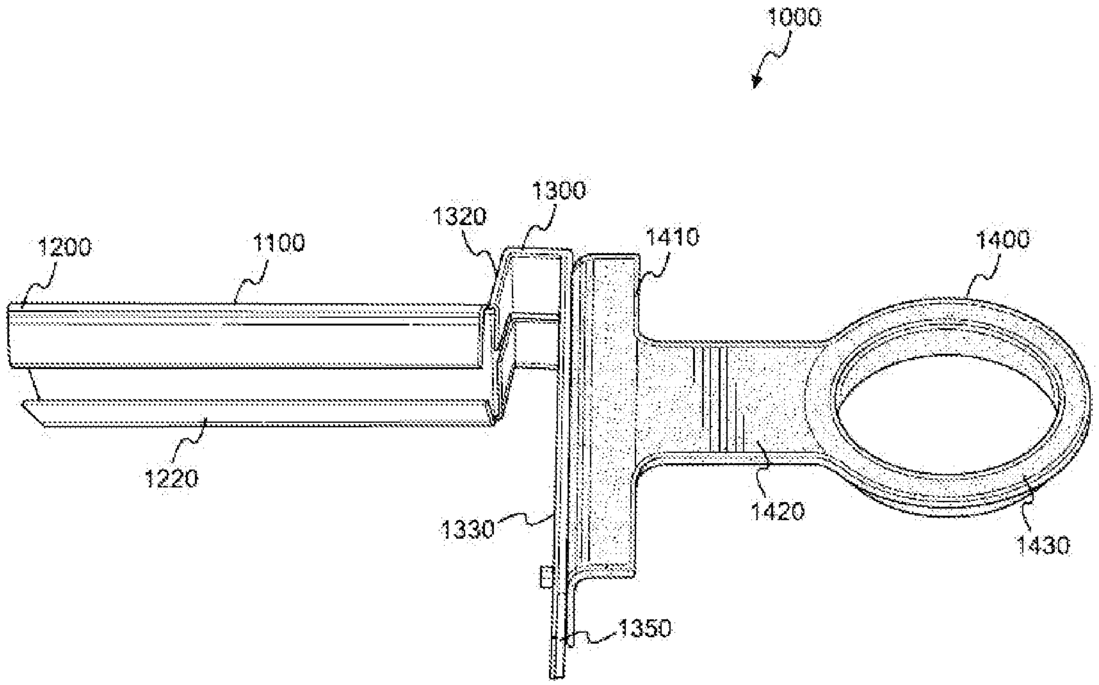
FIG. 1 shows a perspective view of an embodiment of the mounting device.

Reference is made herein to the attached drawings. Like reference numerals are used throughout the drawings to depict like or similar elements of the mounting device and system. For the purpose of presenting a brief and clear description of the present invention, the embodiment discussed will be used for suspending objects therefrom. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

Figure 2:
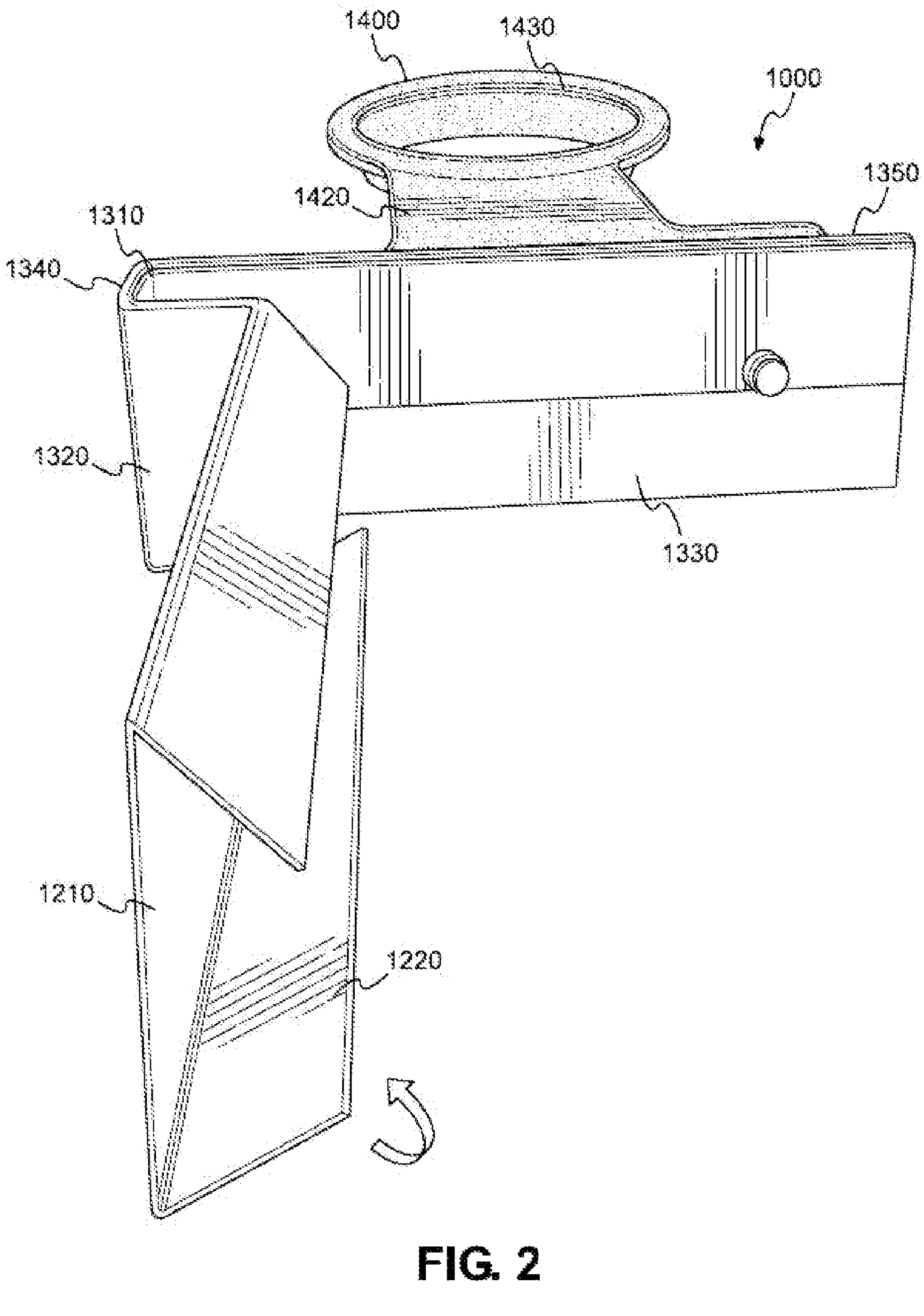
FIG. 2 shows a rear perspective view of the first end of the mounting device.

Referring now to FIGS. 1 and 2, there is shown a perspective view of an embodiment of the mounting device and a rear perspective view of the first end of the mounting device, respectively. In the illustrated embodiment, the mounting device 1000 comprises a fastening member 1100 having a first end 1200 and an opposing second end 1300. The first end 1200 is configured to secure to an existing gutter hanger fastened to an exterior wall, wherein the gutter hanger attaches a first side of a gutter to the exterior wall. In the illustrated embodiment, the first end 1200 of the fastening member 1100 serves as a clip, comprising a support member having a planar segment 1210 and a pair of flanges 1220 extending from lateral sides 1230 of the planar segment 1210. The planar segment 1210 is configured to rest atop the gutter hanger and the pair of flanges 1220 are configured to fold beneath the gutter hanger, securing the mounting device 1000 to the gutter hanger.

The pair of flanges 1220 are movable between a folded and an unfolded configuration. In the unfolded configuration, in some embodiments, an interior angle between a flange and the planar member is greater than 90 degrees. In the folded configuration, the interior angle between a flange and the planar member is less than 90 degrees, such that the flanges overlap one another, in some embodiments, or serve as a catch or latch onto the side of the gutter hanger to prevent the planar member from being removed therefrom, in other embodiments. In the shown embodiment, the flanges 1220 are integral with the planar segment 1210 and bend along a living hinge. In other embodiments, a hinge or other pivot member provides for selective movement of the flanges relative to the planar segment 1210.

In the illustrated embodiment, the planar segment 1210 and the pair of flanges 1220 all comprise a same length as one another. This configuration provides more surface area for the pair of flanges, strengthening the security of the mounting device 1000 to the gutter hanger. In some embodiments, the planar segment comprises a length greater than a length of the pair of flanges. In some embodiments, a band or strap extends from and is configured to wrap around the first end of the fastening member to provide a secondary fastener for securing the mounting device to the gutter hanger.

In the illustrated embodiment, the second end 1300 of the fastening member 1100 comprises a J-shaped bracket 1310 disposed that is adapted to enclose an edge of the gutter that is mounting to the exterior wall with the gutter hanger. The J-shaped bracket comprises a arm 1320 substantially parallel with a gutter plate 1330, and a bend section 1340 disposed therebetween. The bend section 1340 of the channel 1310 is configured to mount atop an opposing second side of the gutter. In the illustrated embodiment, the planar segment 1210 terminates at a distal end of the arm 1320, wherein the bend section 1340 is disposed above the planar segment 1210 and a distal end of the gutter plate 1330 is disposed beneath the planar segment 1210 when the mounting device 1000 is secured to the gutter hanger. In the shown embodiment, the first end 1200 and the second end 1300 of the fastening member 1100 comprise a uniform width, wherein the width measured between lateral sides thereof.

In the illustrated embodiment, the fastening member 1100 is composed of a rigid material, such as metal. However, in alternate embodiments, the fastening member comprises any suitable material such as a hard plastic. In some embodiments, the fastening member is monolithic and formed from a single material. In other embodiments, the first end and the second end are formed using different materials from one another.

The mounting device 1000 further comprises an object fastener 1400 extending from an exterior side 1350 of the gutter plate 1330 of the channel 1310. The object fastener 1400 is configured to receive and suspend an object therefrom. In the illustrated embodiment, the object fastener 1400 comprises a base 1410 secured to the fastening member 1100, a neck 1420 extending from the base 1410, wherein the neck 1420 terminates in an enclosed ring 1430. In other embodiments, the ring is not enclosed forming a partial ring or hook shape. In the illustrated embodiment, the enclosed ring 1430 is aligned vertically relative to the planar segment 1210, such that a longitudinal axis of the enclosed ring 1430 bisects the planar segment 1210.

Figure 5:
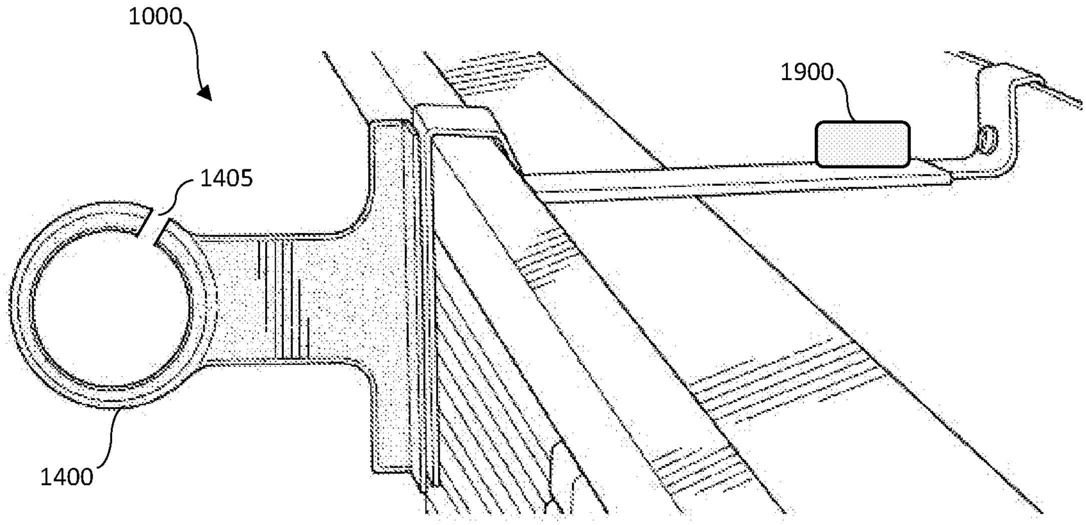
FIG. 5 shows a perspective view of an alternate embodiment of the mounting system.

In some embodiments, the mounting device 1000 comprises a counterweight disposed on the fastening member configured to allow heavier objects to be suspended from the object fastener (as seen in FIG. 5, 1900). The counterweight is any suitable shape or material that provides additional weight to the fastening member 1100. In some embodiments, the counterweight comprises a weighted piece of plastic or metal disposed on an upper surface of the planar member 1210. In other embodiments, the counterweight comprises a weighted piece of plastic or metal that is suspended from the fastening member 1100, within the gutter, when the mounting device 1000 is secured thereto.

Figure 3:
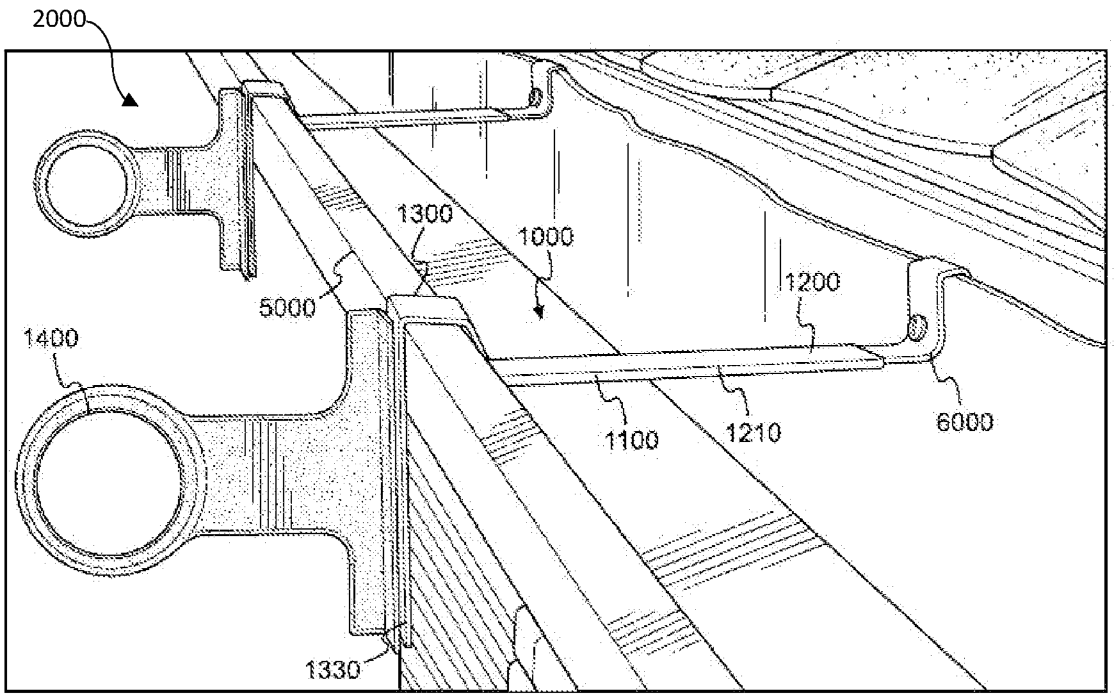
FIG. 3 shows a side perspective view of a plurality of the mounting devices of an embodiment of the mounting system.
Figure 4:
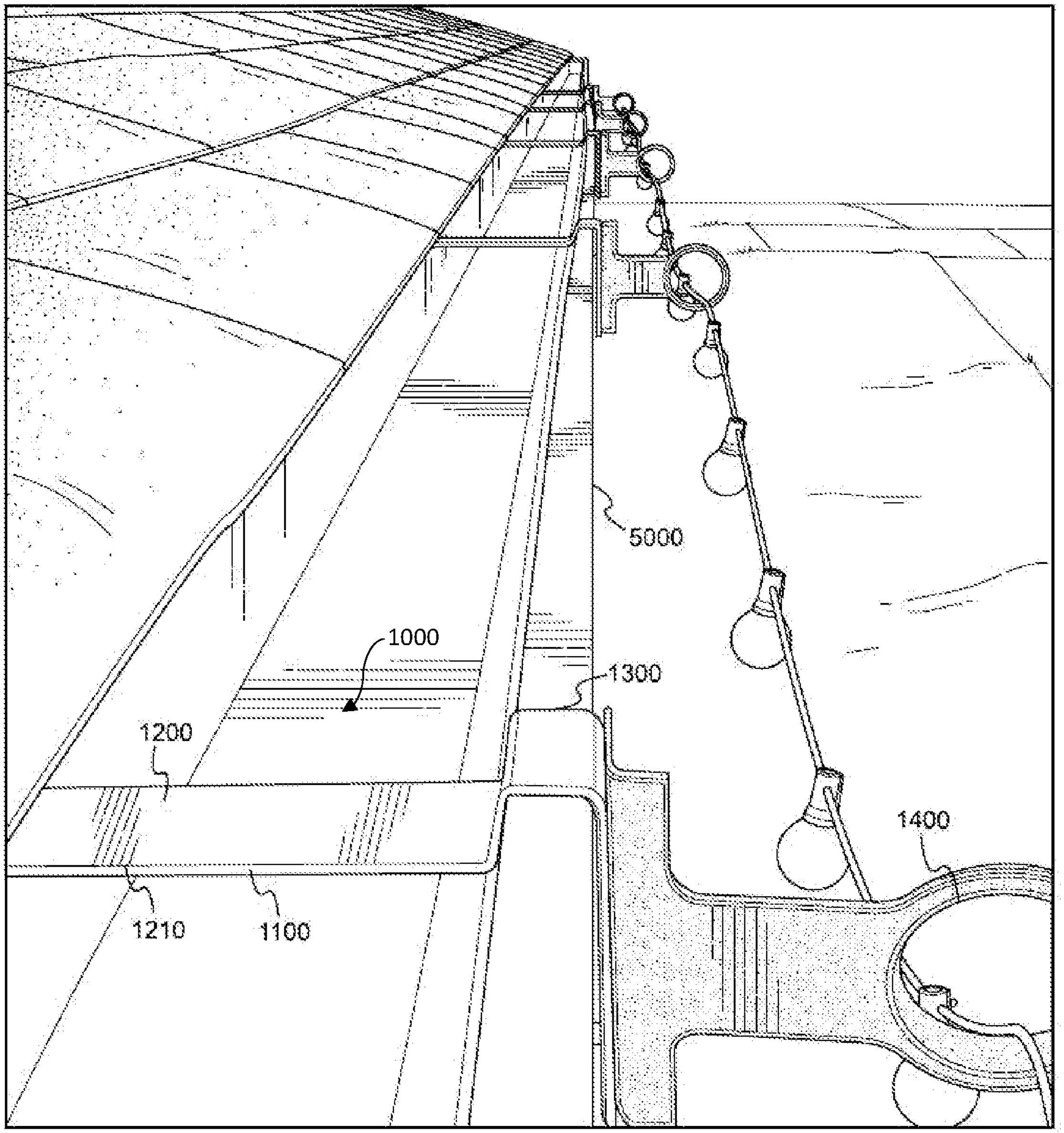
FIG. 4 shows a perspective view of an embodiment of the mounting system in use.

Referring now to FIGS. 3 and 4, there are shown perspective views of an embodiment of the mounting system in use. In the illustrated embodiment, the second side 1300 of the fastening member 1100 mounts over the edge of the second side of the gutter 5000, wherein the first end 1200 of the fastening member 1100 mounts to the gutter hanger 6000. When mounted, an interior side of the gutter plate 1330 of the channel 1310 is configured to rest flush against an exterior of the second side of the gutter 5000. In some embodiments, the first end 1200 of the fastening member 1100 is configured to conceal or mimic the appearance of the gutter hanger. In the illustrated embodiment, the fastening member 1100 comprises a color that corresponds to a color of a portion of the gutter, to provide concealment thereof. The mounting devices 1000 are configured to be installed on as many of the gutter hangers as needed to mount an object to an exterior.

In the illustrated embodiment, a second mounting device 2000 is provided for suspending an object between a plurality of mounting devices that are secured to a plurality of corresponding gutter hangers. In operation, the planar member 1210 is placed atop the gutter hanger and the flanges are each folded such that the gutter hanger is tightly sandwiched between the planar member and the pair of flanges, wherein in the flanges are substantially parallel to the planar member. The second end of the fastening member 1100 is positioned over the edge of the gutter 5000 such that the object fastener 1400 overhangs the gutter 5000. An object, such as a string of lights, is threaded through each object fastener. In this way, the lights are hung on an exterior of a housing without permanently securing the mounting device to the gutter hanger, the gutter, or an exterior wall. As used herein, "permanently" or "permanent" means without the use of a fastener that punctures another structure in order to fasten to it, such as with a nail or screw.

Figure 6:
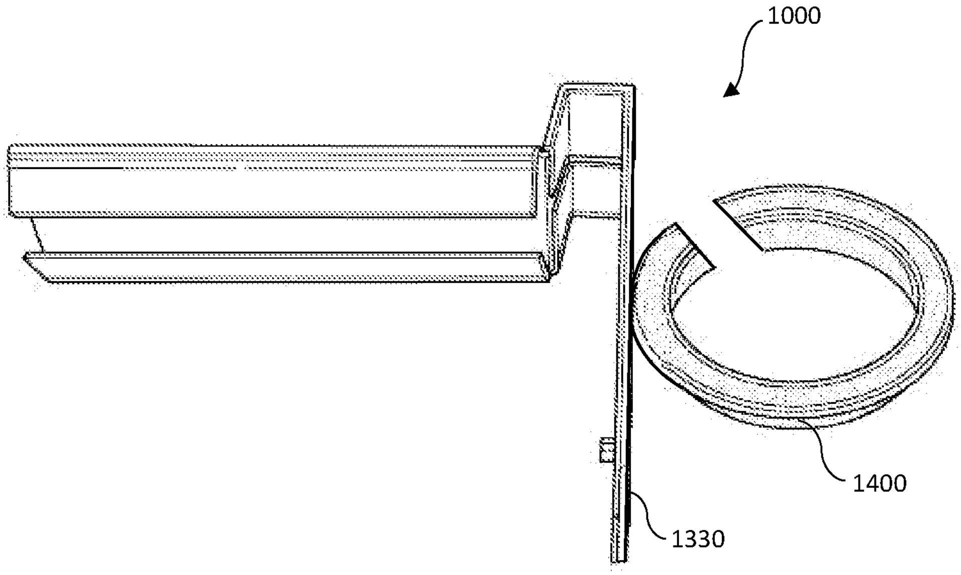
FIG. 6 shows a perspective view of another alternate embodiment of the mounting system.

Referring now to FIGS. 5 and 6, there are shown perspective views of alternate embodiments of the mounting system. In the illustrated embodiment, the object fastener 1400 comprises an opening 1405 configured to receive an object therethrough, such as a string or hook from an object adapted to be suspended therefrom. In the illustrated embodiment, the opening 1405 is positioned at a rear side of the object fastener 1400, wherein the opening is not visible when viewing the object fastener from a front side or from therebeneath. In this way, the opening is not visible from a viewer's perspective when looking at the roofline from the ground below. The positioning and concealment of the opening provides added security against potential theft of objects disposed within the object fastener.

In alternate embodiments, the object fastener 1400 extends directly from the exterior side of the gutter plate 1330. In some embodiments, it is desirable to suspend an object closer to the building and therefore having no base or neck positioned between the gutter plate and the object fastener allows the object fastener 1400 to have the appearance of being secured directly to the gutter (as shown in FIG. 6).

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mounting device for suspending an object, comprising:
  - a fastening member having a first end and an opposing second end, wherein the first end is configured to secure to a gutter hanger that attaches a first side of a gutter to a surface;
  - a J-shaped bracket forming a channel disposed on the second end of the fastening member adapted to enclose an outside edge of the gutter;
  - wherein the J-shaped bracket comprises an arm that is substantially parallel with a gutter plate having a bend section disposed therebetween to form the channel;
  - an object fastener extending from an exterior side of the gutter plate;
  - wherein a support member extends from the arm to the first end of the fastener member, the support member comprising a planar segment having a pair of flanges extending from lateral sides thereof, wherein the support member is configured to receive the gutter hanger wherein the planar segment rests atop the gutter hanger and the flanges wrap around the gutter hanger.

2. The mounting device of claim 1, wherein the planar segment and the pair of flanges all comprise a same length as one another.

3. The mounting device of claim 1, wherein the planar segment comprises a length greater than a length of the pair of flanges.

4. The mounting device of claim 1, wherein the pair of flanges are movable between a folded and an unfolded configuration, in the unfolded configuration an interior angle therebetween is greater than 90 degrees and in the folded configuration the interior angle therebetween is less than 90 degrees.

5. The mounting device of claim 1, wherein the object fastener is disposed on an exterior side of the gutter plate.

6. The mounting device of claim 1, wherein the planar segment terminates at a distal end of the arm of the J-shaped and the bend section is disposed above the planar segment when the device is secured to the gutter hanger.

7. The mounting device of claim 5, wherein a distal end of the gutter plate is disposed beneath the planar segment when the device is secured to the gutter hanger.

8. The mounting device of claim 1, wherein the first end and the second end comprise a uniform width, the width measured between lateral sides thereof.

9. The mounting device of claim 1, wherein the object fastener comprises a base secured to the fastening member, a neck extending from the base and terminates in an enclosed ring.

10. The mounting device of claim 1, wherein the object fastener comprises a base secured to the fastening member, a neck extending from the base and terminates in a hook.

11. The mounting device of claim 1, further comprises a second mounting device for suspending an object between a plurality of mounting devices secured to a plurality of corresponding gutter hangers.

12. The mounting device of claim 9, wherein the enclosed ring is aligned vertically relative to the planar segment, such that a longitudinal axis of the enclosed ring bisects the planar segment.

13. The mounting device of claim 1, wherein an interior side of the gutter plate is configured to rest flush against an exterior of the second side of the gutter.

14. The mounting device of claim 1, wherein the first end of the fastening member is configured to conceal the gutter hanger.

15. The mounting device of claim 1, further comprising a counterweight disposed on the first end of the fastening member.

16. The mounting device of claim 1, wherein the object fastener extends directly from the gutter plate.

17. The mounting device of claim 1, wherein the object fastener comprises an opening such that the object fastener forms an open ring.

18. The mounting device of claim 17, wherein the opening is disposed of at a rear side of the object fastener, adjacent to the gutter plate.

19. A mounting device for suspending an object, comprising:

- a fastening member having a first end and an opposing second end, wherein the first end is configured to secure to a gutter hanger that attaches a first side of a gutter to a surface;
- a J-shaped bracket forming a channel disposed on the second end of the fastening member adapted to enclose an outside edge of the gutter;
- wherein the J-shaped bracket comprises an arm that is substantially parallel with a gutter plate having a bend section disposed therebetween to form the channel;
- an object fastener extending from an exterior side of the gutter plate;
- wherein the object fastener comprises a base secured to the fastening member, a neck extending from the base and terminates in an enclosed ring;
- wherein the enclosed ring is aligned vertically relative to the planar segment, such that a longitudinal axis of the enclosed ring bisects the planar segment.

* * * * *